(12) United States Patent
Bae et al.

(10) Patent No.: US 6,733,452 B2
(45) Date of Patent: May 11, 2004

(54) ULTRASOUND IMAGING METHOD AND APPARATUS FOR FORMING COLOR IMAGES BY USING A VARIABLE POWER THRESHOLD LEVEL

(75) Inventors: Moo Ho Bae, Seoul (KR); Ji Hoon Bang, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 0 days.

(21) Appl. No.: 10/121,351

(22) Filed: Apr. 12, 2002

(65) Prior Publication Data

US 2002/0165453 A1 Nov. 7, 2002

(30) Foreign Application Priority Data

Apr. 13, 2001 (KR) ........................................ 2001-19766

(51) Int. Cl.⁷ ................................................ A61B 8/00
(52) U.S. Cl. .................................................... 600/443
(58) Field of Search ........................ 600/431, 440–441, 600/443, 447, 454–456; 128/916; 73/625–626; 382/128

(56) References Cited

U.S. PATENT DOCUMENTS

| | | | | |
|---|---|---|---|---|
| 5,287,753 A | * | 2/1994 | Routh et al. ............. | 73/861.25 |
| 5,653,234 A | * | 8/1997 | Kim et al. ................... | 600/437 |
| 6,120,446 A | * | 9/2000 | Ji et al. ...................... | 600/437 |
| 6,398,733 B1 | * | 6/2002 | Simopoulos et al. ....... | 600/443 |
| 6,423,003 B1 | * | 7/2002 | Ustuner et al. ............. | 600/443 |
| 6,512,854 B1 | * | 1/2003 | Mucci et al. ............... | 382/275 |

* cited by examiner

Primary Examiner—Francis J. Jaworski
(74) Attorney, Agent, or Firm—Thelen Reid & Priest LLP; David B. Ritchie

(57) ABSTRACT

An ultrasound imaging method and apparatus forms high-quality color ultrasound images by using variable power threshold levels depending on pixel position. The method comprises the steps of determining a power threshold level that is varied depending on a noise, transmitting ultrasound signals from at least one transducer array to a target object, receiving a first signal including a signal reflected from the target object mixed with a noise, and imaging an ultrasound image of the target object corresponding to the first signal when the power level of the first signal is greater than the variable power threshold level. The apparatus comprises one or more transducers for transmitting an ultrasound signal to an object and receiving a first signal including a reflected signal from the object mixed with a noise; and a digital signal processor for forming an ultrasound image of the object corresponding to the first signal when a power level of the first signal is greater than a variable power threshold level.

22 Claims, 5 Drawing Sheets

ULTRASOUND IMAGING METHOD AND APPARATUS FOR FORMING COLOR IMAGES BY USING A VARIABLE POWER THRESHOLD LEVEL

FIELD OF THE INVENTION

The present invention relates to an ultrasound imaging method and apparatus, and more particularly, to an ultrasound imaging method and apparatus for forming color images by using a power threshold level that is varied depending on a pixel's position within a color image for isolating noises and color signals.

BACKGROUND OF THE INVENTION

Figure 1:
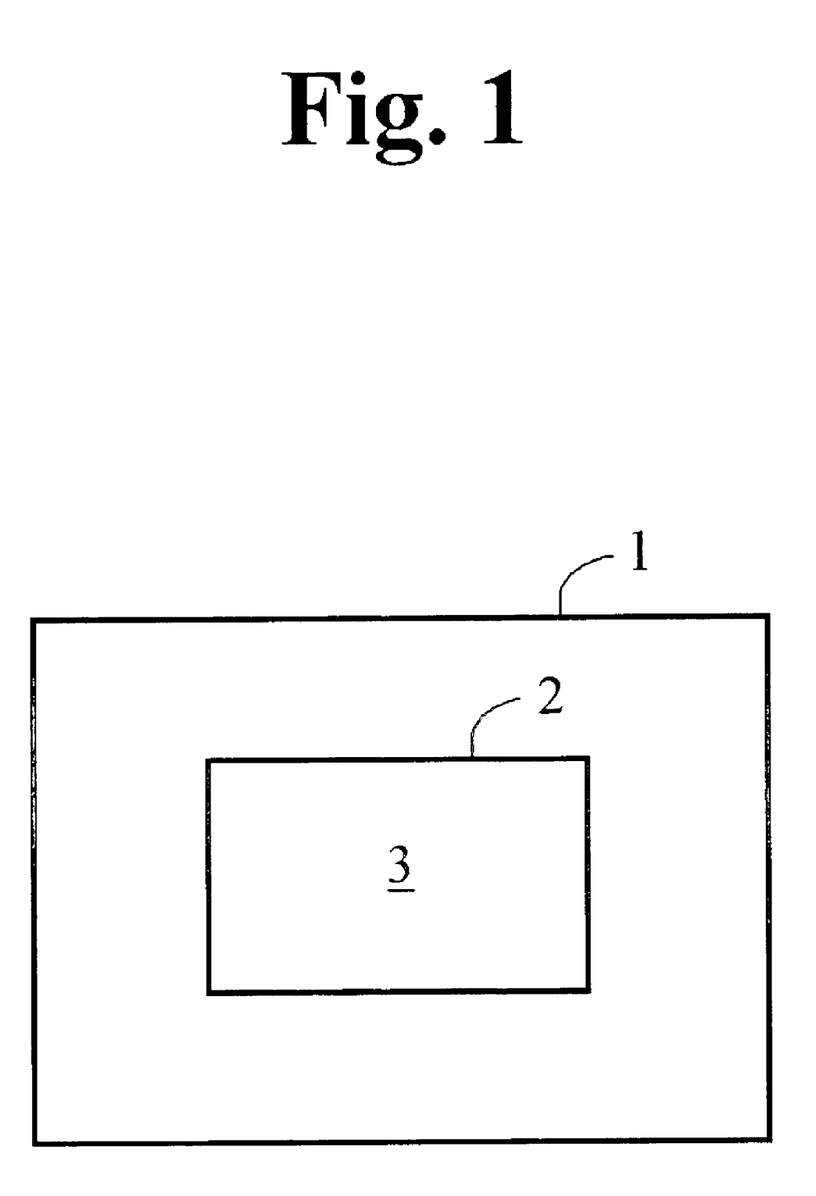
FIG. 1 shows a B (Brightness) mode image.

An ultrasound imaging system with a color mode imaging capability is known to be able to provide a color image in addition to a B (Brightness) mode image. Referring to FIG. 1, an exemplary display of a color image within a color box is shown, wherein reference numerals 1, 2 and 3 indicate a B mode image, a color box, and a color image, respectively.

Figure 2:
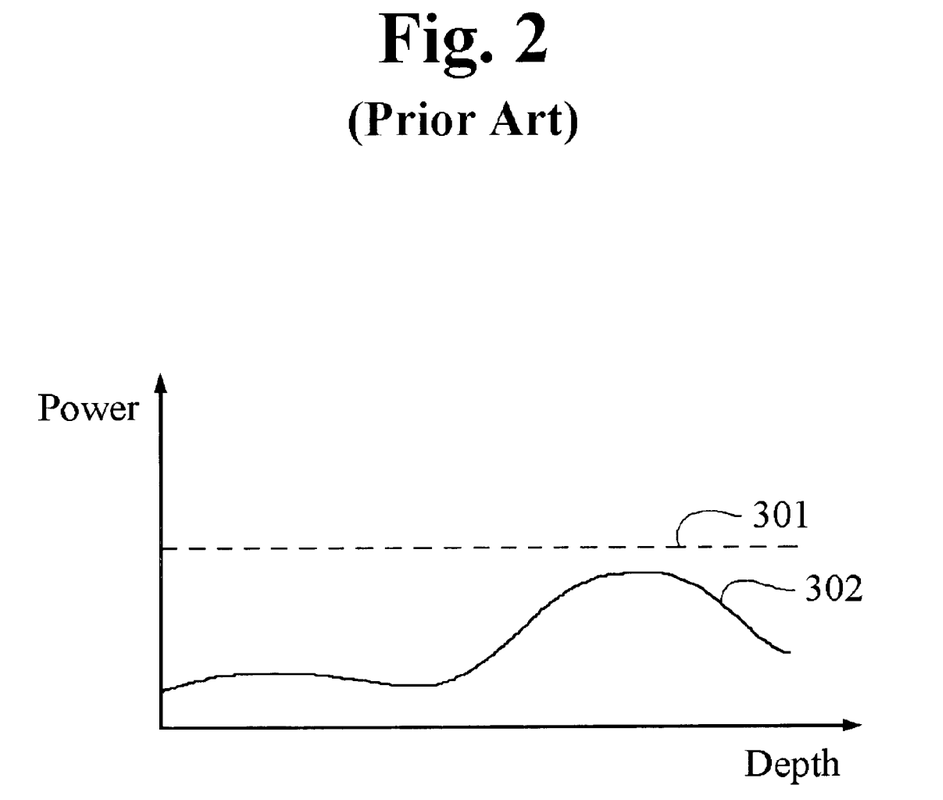
FIG. 2 is a graphical representation of a conventional power threshold level and a noise power level.

Conventionally, a power threshold level for isolating noises and color signals is determined as a constant regardless of pixel's position. Referring to FIG. 2, there is illustrated a graphical representation of a conventional power threshold level 301 and a noise power level 302 corresponding to the pixel's position along the direction perpendicular to a probe in an image showing a target object. In FIG. 2, the horizontal transverse axis represents depth in an axial direction and the vertical longitudinal axis represents power level. As shown in FIG. 2, the power threshold level 301 has a constant value. Therefore, in the prior art, a color display is determined by comparing the noise power level 302 with the power threshold level 301 regardless of the variation of the noise power level 302 along the depth. Specifically, if the level of an input power is higher than the power threshold level 301, a color corresponding to the input power is displayed. Otherwise, the input power is regarded as a noise, and the corresponding color is not displayed. Use of the power threshold level 301 as noted above causes problems such as weak input powers being regarded as noise. Consequently, a color corresponding to the weak input power may not be displayed on an image.

Further, due to various characteristics depending on the pixel's position, such as TGC (Time Gain Compensation), an apodization using a function can be varied depending on an axial direction, and the change of aperture size, the gain of a color signal may also be varied depending on the pixel's position. Specifically, the TGC compensates the ultrasound attenuation caused by the human body such that it makes a pixel in proximity to a transducer have small gain and a pixel out of proximity thereto have large gain. In general, the function varied depending on the axial direction of a scan line is used as an apodization profile and utilized in the apodization that applies different gains to each channel. The aperture size of a scan line in proximity to both edges of a transducer is relatively smaller than that of another scan line. Thus, the actual range of a noise may be varied depending on the above-mentioned characteristics.

Therefore, if a power threshold level having a constant value is used to process a receiving signal, e.g. a color Doppler signal, noise is filtered improperly or a color signal is extremely removed from the receiving signal, thereby deteriorating the quality of images.

SUMMARY OF THE INVENTION

It is, therefore, an object of the present invention to provide an ultrasound imaging method and apparatus for forming high-quality color ultrasound images by using a variable power threshold level that is varied depending on the pixel's position.

It is another object of the present invention to provide an ultrasound imaging method and apparatus capable of obtaining a noise profile depending on the pixel's position.

According to one aspect of the present invention, there is provided an ultrasound imaging method, comprising the steps of (a) determining a variable power threshold level based on a noise, (b) transmitting ultrasound signals from at least one transducer array to a target object, (c) receiving a first signal including a signal reflected from the target object mixed with a noise, and (d) imaging an ultrasound image of the target object corresponding to the first signal when the power level of the first signal is greater than the variable power threshold level.

According to another aspect of the present invention, there is provided an ultrasound imaging apparatus, comprising, one or more transducer(s) for transmitting an ultrasound signal to an object and receiving a first signal including a reflected signal from the object mixed with a noise, and a digital signal processor for forming an ultrasound image of the object corresponding to the first signal when a power level of the first signal is greater than a variable power threshold level.

BRIEF DESCRIPTION OF THE DRAWINGS

The above and other objects and features of the present invention will become apparent from the following description of preferred embodiments given in conjunction with the accompanying drawings.

DETAILED DESCRIPTION OF PREFERRED EMBODIMENTS

Figure 3:
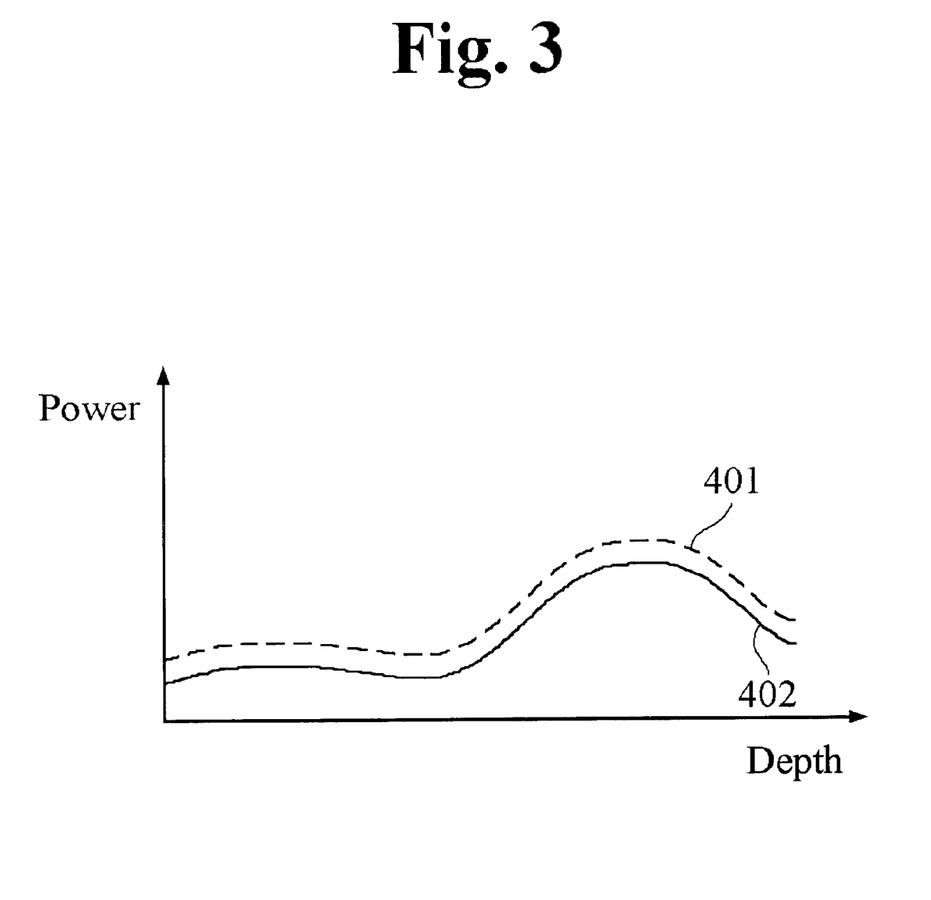
FIG. 3 is a graphical representation of the variable power threshold level and noise power level of the present invention.

FIG. 3 is a graphical representation of a variable power threshold level 401 and a noise power level 402 according to the present invention. In FIG. 3, the horizontal transverse axis represents depth in an axial direction and the vertical longitudinal axis represents power level.

As shown in FIG. 3, the present invention isolates noise and color signals by using the variable power threshold level 401 that is varied depending on the pixel's position. Specifically, a color corresponding to an input power is displayed if the level of input power is higher than the variable power threshold level 401; otherwise, the corresponding color is not displayed as it is regarded as noise. Unlike conventional technology, a weak color signal can be displayed as the variable power threshold level 401 has a profile varied along the noise power level 402.

As described in detail with reference to the accompany drawings, the variable power threshold level 401 is determined after obtaining a noise profile, wherein the noise profile may be varied depending on the ultrasound imaging circumstances.

Figure 4:
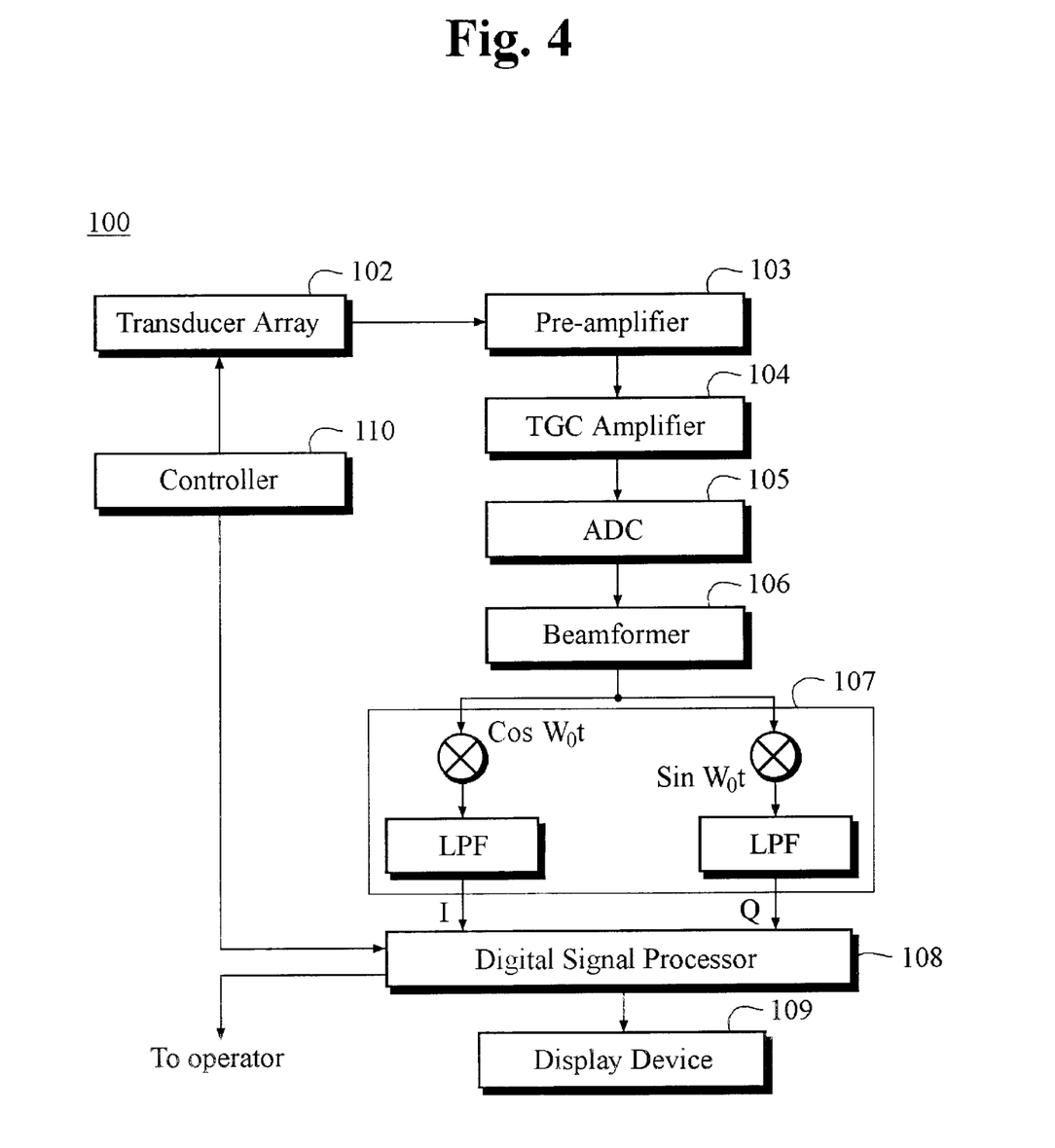
FIG. 4 is a schematic block diagram of an ultrasound imaging apparatus in accordance with the present invention.

FIG. 4 is a schematic block diagram of an ultrasound imaging apparatus in accordance with the present invention. The ultrasound imaging apparatus 100 with a color mode imaging capability comprises a transducer array 102, a pre-amplifier 103, a TGC (Time Gain Compensation) amplifier 104, an ADC (Analog-to-Digital Converter) 105, a beamformer 106, a quadrature demodulator 107, a digital signal processor 108, a display deice 109, and a controller 110.

The transducer array 102 transmits ultrasound signals to a target object, such as an erythrocyte in a human body, and receives reflected signals mixed with noise from the target object. The transducer array 102 connected to the pre-amplifier 103 sends the reflected signals thereto. The pre-amplifier 103 coupled to the TGC amplifier 104 amplifies the reflected signals from the transducer array 102 and forwards it to the TGC amplifier 104. The TGC amplifier 104 is connected to the ADC 105. With respect to the reflected signals, the TGC amplifier 104 changes time-variable gain in order to compensate the attenuation due to an ultrasound transmission distance within the human body and amplifies the reflected signals to output to the ADC 105. The ADC 105 connected to the beamformer 106 converts the output of the TGC amplifier 104 into digital signals and sends them to the beamformer 106.

The beamformer 106 connected to the quadrature demodulator 107 performs a receive-focusing operation on the digital signals from the ADC 105 and sends them to the quadrature demodulator 107. The quadrature demodulator 107 connected to the digital signal processor 108 demodulates the digital signals from the beamformer 106 by using the known quadrature demodulation technology, and generates I (in-phase) and Q (quadrature) signals and outputs them to the digital signal processor 108. The digital signal processor 108 coupled to the display device 109 obtains the power, velocity and variance of the reflected signals by using the I and Q signals transmitted from the quadrature demodulator 107 and outputs them to the display device 109. The display device 109 then displays colors corresponding to the obtained power, velocity and variance.

The controller 110 controls the transducer array 102 and the digital signal processor 108 in order to determine the variable power threshold level. The digital signal processor 108 isolates noises and color signals by using the variable power threshold level that is varied depending on the pixel's position. The controller 110 controls the transducer array 102 and the digital signal processor 108 in order to determine the variable power threshold level by obtaining a noise profile. For the purpose of obtaining the noise profile, the controller 110 controls the transducer array 102 to receive signals reflected from a target object without transmitting an ultrasound signal to the target object. The transducer array 102 does not receive the reflected signals. In this case, a power obtained in the digital signal processor 108 becomes a noise power. The controller 110 then controls the digital signal processor 108 to determine the variable power threshold level with reference to that noise power. It is preferable to consider a signal transmission interval in order to eliminate the interference of a previously transmitted signal in obtaining the noise power.

Figure 5:
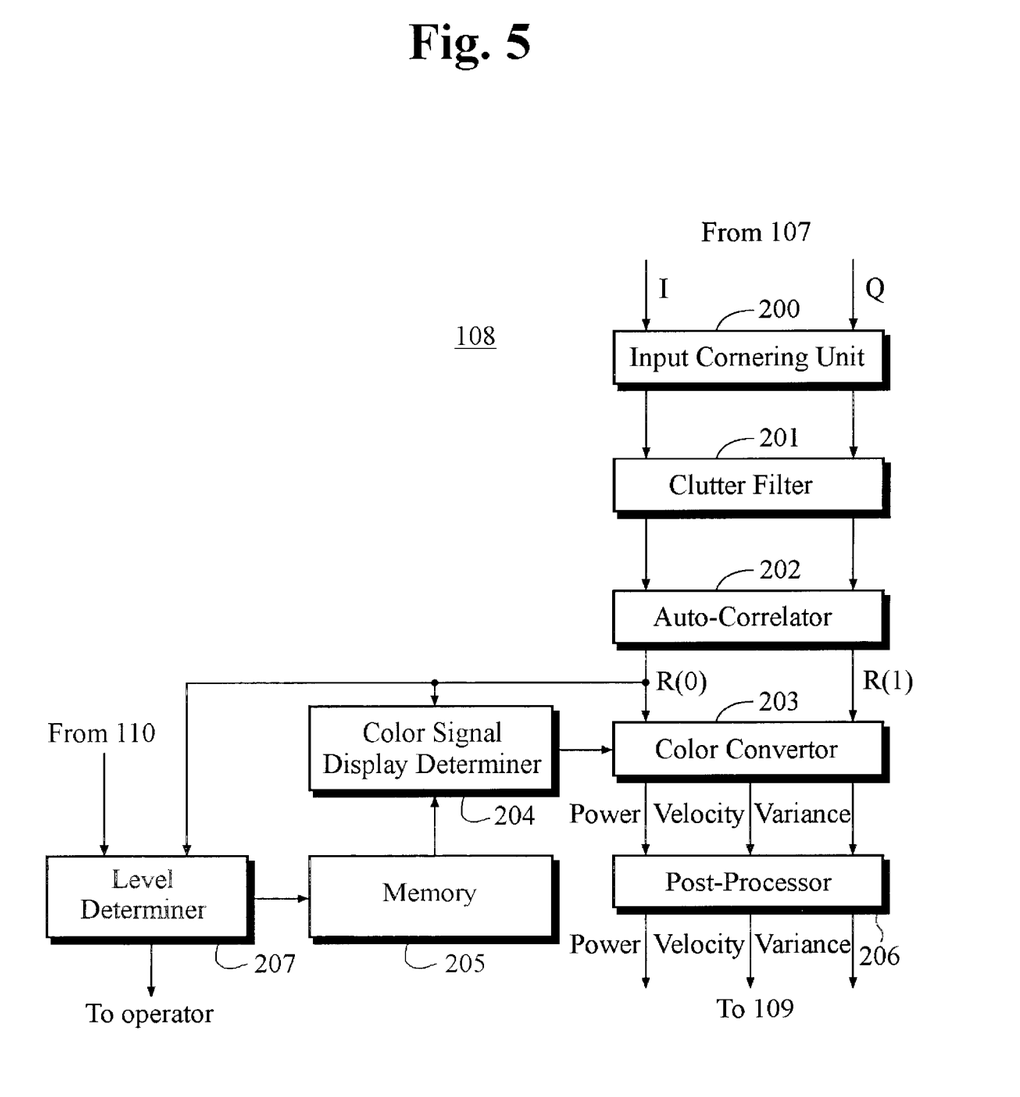
FIG. 5 represents a detailed block diagram of the digital signal processor shown in FIG. 4.

FIG. 5 represents a detailed block diagram of the digital signal processor 108 shown in FIG. 4. The digital signal processor 108 includes an input cornering unit 200, a clutter filter 201, an auto-correlator 202, a color converter 203, a color signal display determiner 204, a memory 205, a post-processor 206, and a level determiner 207.

The I and Q signals are inputted from the quadrature demodulator 107 shown in FIG. 4 to the input cornering unit 200 of the digital signal processor 108. In order to obtain data for a specific scan line, ensemble data obtained by repetitive receiving and transmitting ultrasound signals with respect to that scan line is generally used. Thus, each of the I and Q signals is considered as a function having an ensemble index and a depth index as a variable, wherein the ensemble index is changed relatively slower than the depth index. The input cornering unit 200 re-arranges the inputted I and Q signals bearing data of the same depth in the order of the ensemble index and transmits the re-arranged I and Q signals to the clutter filter 201. As will be disclosed in the following description, the clutter filter 201 and the auto-correlator 202 filter a series of data having the same depth to obtain an autocorrelation value.

The re-arranged I and Q signals are inputted to the clutter filter 201. The clutter filter 201 isolates signals of the re-arranged I and Q signals (referred to as "clutters") reflected from a target object, such as tissue rather than blood, which moves at a relatively slow velocity. The reflected signals from the target object are primarily composed of low frequency components, so that the clutter filter 201 uses a high-pass filter. The clutter filter 201 filters the re-arranged I and Q signals inputted from the input cornering unit 200 to transmit same to the auto-correlator 202.

The auto-correlator 202 calculates auto-correlation values with respect to the filtered I and Q signals to obtain the power, velocity and variance thereof. The autocorrelation values are denoted as R(0) and R(1) in FIG. 5. An autocorrelation value R(n) is expressed as follow:

$$R(n) = \sum_{i=-\infty}^{\infty} x(i)x^*(i-n) \quad \text{(Eq. 1).}$$

The auto-correlator 202 is connected to the color converter 203, the color signal display determiner 204, and the level determiner 207. The auto-correlator 202 transmits R(0) and R(1) to the color converter 203, while it sends R(0) only to the color signal display determiner 204 and the level determiner 207.

According to one embodiment of the present invention, the level determiner 207 obtains a noise profile under control of the controller 110 shown in FIG. 4, by regarding a power R(0) provided from the auto-correlator 202 as a noise power when the transducer array 102 does not transmit an ultrasound signal to the target object. A variable power threshold level is determined depending on the noise profile to be stored in the memory 205. For example, the noise profile may be changed by every scan line and/or depth. The noise profile within an ultrasound image being displayed may be changed depending on the pixel's position.

The level determiner 207 determines whether the ultrasound imaging apparatus 100 normally operates based on the noise profile obtained to notify the determination results to an operator (not shown). For instance, when the noise profile is deviating from a normal value (i.e. the level of the noise power is too high), the digital signal processor 108 transmits to the operator an alarm message or notice that the ultrasound imaging apparatus 100 is abnormal, via a local area network (LAN) or the Internet (not shown).

The memory 205 stores the variable power threshold level obtained in the level determiner 207 and provides it to the color signal display determiner 204. The memory 205 stores a plurality of variable power threshold levels that is varied depending on depths and/or scan lines and provides to the color signal display determiner 204, one of the stored variable power threshold levels corresponding to a pixel currently being processed.

The color signal display determiner 204 compares R(0) inputted from the auto-correlator 202 with the power threshold level provided by the memory 205. If R(0) is higher than the power threshold level, the color signal display determiner 204 transmits a display enable signal to the color converter 203; otherwise, it provides a display disenable signal thereto.

In response to the display enable signal, the color converter 203 calculates the velocity, power and variance of I and Q signals based on R(0) and R(1) inputted from the auto-correlator 202 and transmits the calculated velocity, power and variance as a color signal to the post-processor 206. The post-processor 206 then processes the color signal and transmits it to the display device 109 shown in FIG. 4. In response, the display device 109 displays a color corresponding to the color signal.

In response to the display disable signal, the color converter 203 transmits the color signal having power=velocity=variance=0 to the post-processor 206 regardless of R(0) and R(1).

For improving an image quality, the post-processor 206 performs smoothing filtering, frame averaging and frame interpolation, which are well known in the art, on the color signal inputted from the color converter 203, and provides them to the display device 109.

Hereinbelow, an operation for displaying a color image by using the variable power threshold level according to the present invention will be described in detail.

A noise profile depending on the pixel's position in the color image is measured and obtained when an ultrasound imaging apparatus is designed or manufactured, and the noise profile obtained can be used in subsequent procedures. The noise profile can be changed due to various reasons and it is possible to continuously measure the noise profile during the operation of the ultrasound imaging apparatus and determine the variable power threshold level.

As described above, the level determiner 207 is a unit for obtaining the variable power threshold level according to the noise profile that was obtained corresponding to each scan line within one frame of the color box 2 shown in FIG. 1. As illustrated in FIG. 3, the level determiner 207 determines the variable power threshold level 401 varied depending on the noise power level 402. Since a noise is isolated by using the variable power threshold level 401, the ultrasound imaging apparatus can effectively display even weak color signals.

In one embodiment according to the present invention, the controller 110 of FIG. 4 controls the transducer array 102 to determine the noise profile by performing a receiving operation without transmitting the ultrasound signal thereto during a time interval corresponding to one frame of the color box 2. Thus, there is no reflected signal so that a power obtained in the auto-correlator 202 of the digital signal processor 108 is a noise power. The controller 110 controls the level determiner 207 to obtain the noise profile corresponding to each scan line along the direction of the depth by using the noise power obtained to determine the variable power threshold level based on the noise profile. Here, the noise profile is a 2-D (two-dimensional) profile and is stored in the memory 205.

As described above, when the noise profile corresponding to each scan line is obtained, a time interval corresponding to one frame is required in order to obtain the noise profile corresponding to all scan lines within said one frame of the color box 2. If a color image is not obtained during that time interval, the frame rate of the color image is decreased.

In another embodiment according to the present invention, it is assumed that a noise profile corresponding to one scan line within the color image is identical to that of the remaining scan lines in order to reduce time required to obtain all noise profiles corresponding to the scan lines. Thus, it is possible to use the obtained noise profile corresponding to the one scan line for the remaining scan lines as their noise profile. In order to achieve this, the transducer array 102, under the control of the controller 110, does not transmit an ultrasound signal to the target object during a time interval corresponding to one scan line and performs a receiving operation during that time interval so that the level determiner 207 of the digital signal processor 108 obtains a noise profile corresponding to one scan line. The noise profile is a 1-D (one-dimensional) profile and is stored in the memory 205.

In yet another embodiment according to the present invention, the controller 110 controls the transducer array 102 and the level determiner 207 to obtain a noise profile corresponding to one scan line, wherein the scan lines have the same aperture opening state to each other.

In still another embodiment of the present invention, the controller 110 controls the transducer array 102 and the level determiner 207 to obtain a noise profile corresponding to one scan line within the color image during one frame. In this case, noise profiles corresponding to all scan lines within the color image can be obtained after passing a number of frames having the same number of all scan lines. Although the updating speed of the noise profile becomes slower, this is advantageous unless the noise profile itself is dramatically varied over passage of time.

Although the methods for updating the noise profile with a predetermined rate have been described in the aforementioned embodiments, the present invention is by no means limited thereto. For instance, a user can update the noise profile with a variable rate.

In still another embodiment of the present invention, the controller 110 controls the transducer array 102 and the level determiner 207 to obtain a noise profile corresponding to one scan line within the color image by using a number of ensembles less than the number of ensembles being used for obtaining an actual color Doppler image. To prevent increasing an estimation error, the noise profile can be obtained by averaging a newly obtained noise profile and a previously obtained noise profile.

In one embodiment according to the present invention, R(0) applied from the auto-correlator 202 to the level determiner 207 is used as the noise profile representing a noise power when an ultrasound signal is not transmitted to the target object. In another embodiment of the present invention, R(1) outputted from the auto-correlator 202 is applied to the level determiner 207, thereby using the absolute value of R(1) as the noise power.

While the present invention has been described with respect to the particular embodiments, it will be apparent to those skilled in the art that many changes and modifications may be made without departing from the spirit and scope of the invention as defined in the appended claims.

What is claimed is:

1. An ultrasound imaging method, comprising the steps of:
   (a) obtaining a power profile during a predetermined time interval without transmitting an ultrasound signal to a target object and determining a power threshold level on the basis of the power profile, wherein said power threshold level is varied depending on a noise;

(b) transmitting ultrasound signals from at least one transducer array to the target object;

(c) receiving a first signal including a signal reflected from the target object mixed with a noise; and (d) imaging an ultrasound image of the target object corresponding to said first signal when the power level of said first signal is greater than said variable power threshold level.

2. The method of claim 1, wherein said variable power threshold level is varied depending on each pixel position in said ultrasound image.

3. The method of claim 2, wherein said ultrasound image is a color image.

4. The method of claim 3, wherein the step (a) further comprises the steps of:

receiving a noise corresponding to each scan line within one frame of the color image during the predetermined time interval corresponding to said one frame;

obtaining the power profile of the received noise corresponding to said each scan line by performing an auto-correlation on the received noise; and determining a power level as greater than a predetermined value than the level of the power profile as said variable power threshold level corresponding to said each scan line.

5. The method of claim 3, wherein the step (a) further comprises the steps of:

receiving a noise corresponding to one scan line within one frame of the color image during the predetermined time interval corresponding to said one frame;

obtaining the power profile of the received noise corresponding to said one scan line by performing an auto-correlation on the received noise; and determining a power level as greater than a predetermined value than the level of the power profile as said variable threshold level corresponding to all scan lines within said one frame.

6. The method of claim 3, wherein the step (a) further comprises the steps of:

receiving a noise corresponding to one scan line per each scan line group among a plurality of scan line groups within one frame of the color image;

obtaining the power profile of the received noise corresponding to said one scan line per each scan line group by performing an auto-correlation on the received noise; and determining a power level as greater than a predetermined value than the level of the power profile as said variable threshold level corresponding to said one scan line per each scan line group.

7. The method of claim 3, wherein the step (a) further comprises the steps of:

receiving a noise corresponding to each of all scan lines within the color image during the predetermined time interval corresponding to frames of the same number of said all scan lines, by sequentially acquiring a noise corresponding to one scan line within each of the frames during a time interval corresponding to said each frame of the color image;

obtaining the power profile of the received noise corresponding to said each of all scan lines by performing an auto-correlation on the received noise; and determining a power level as greater than a predetermined value than the level of the power profile as said variable threshold level corresponding to said each of all scan lines.

8. The method of claim 3, wherein the step (a) further comprises the steps of:

receiving a noise corresponding to one or more scan line within one frame of the color image by using a number of ensembles less than a predetermined number of ensembles, said predetermined number of ensembles being used to form the color image;

obtaining the power profile of the received noise corresponding to said one or more scan line by performing an auto-correlation on the received noise; and determining said variable power threshold level corresponding to said one or more scan line based on the power profile obtained.

9. An ultrasound imaging apparatus, comprising:

one or more transducer(s) for transmitting an ultrasound signal to a target object;

means for receiving a first signal including a reflected signal from the target object mixed with a noise;

means for measuring a noise power profile by performing an auto-correlation on a noise applied from the receiving means, wherein the noise is obtained at the receiving means during a predetermined time interval when said one or more transducer(s) does not transmit the ultrasound signal to the target object;

means for determining a power threshold level that is varied depending on said noise power profile; and means for forming an ultrasound image of the target object corresponding to the first signal when a power level of the first signal is greater than said variable power threshold level.

10. The apparatus of claim 9, wherein said variable power threshold level is varied depending on each pixel position in the ultrasound image.

11. The apparatus of claim 10, wherein the ultrasound image is a color image.

12. The apparatus of claim 11, further comprising:

means for controlling the receiving means to receive the noise in order to obtain the noise power profile.

13. The apparatus of claim 12, wherein the control means controls the receiving means to receive the noise corresponding to one or more scan line(s) within one frame of the color image during the predetermined time interval corresponding to said one frame, thereby applying the noise to the measuring means.

14. The apparatus of claim 12, wherein the controlling means controls the receiving means to receive a the noise corresponding to one scan line per each scan line group among a plurality of scan line groups within one frame of the color image, thereby applying the noise to the measuring means, wherein said each scan line group includes one or more scan line(s) having a same aperture of said one or more transducer(s).

15. The apparatus of claim 12, wherein the controlling means controls the receiving means to receive the noise corresponding to each scan line within one frame of the color image by using a number of ensembles less than a predetermined number of ensembles, thereby applying the noise to the measuring means, wherein said predetermined number of ensembles are used to form the color image.

16. A method for obtaining a variable power threshold level in an ultrasound imaging apparatus including one or more transducer(s) for transmitting an ultrasound signal to an object, means for receiving a first signal including a reflected signal from the object mixed with a noise, and means for forming an ultrasound image of the object corresponding to the first signal when a power level of the first signal is greater than said variable power threshold level, comprising the steps of:

a) receiving a noise from said one or more transducer(s) during a predetermined time interval without transmitting the ultrasound signal to the object; and b) obtaining said variable power threshold level by performing an auto-correlation on the received noise to obtain an auto-correlation value of the received noise.

17. The method of claim 16, wherein said variable power threshold level is varied depending on pixel position in the ultrasound image.

18. The method of claim 16, wherein the step a) further comprises the step of receiving the noise corresponding to each scan line within one frame of the ultrasound image during the predetermined time interval corresponding to said one frame, and wherein the step b) further comprises the steps of:
  obtaining a power profile of the received noise corresponding to said each scan line based on the auto-correlation value; and
  determining said variable power threshold level based on the power profile.

19. The method of claim 16, wherein the step a) further comprises the step of receiving the noise corresponding to one scan line within one frame of the ultrasound image during the predetermined time interval corresponding to said one frame, and wherein the step b) further comprises the steps of:
  obtaining a power profile of the received noise corresponding to said one scan line based on the auto-correlation value; and
  determining a power level as greater than a predetermined value than the level of the power profile as said variable power threshold level corresponding to all scan lines within said one frame.

20. The method of claim 16, wherein the step a) further comprises the step of receiving the noise corresponding to one scan line per each scan line group among a plurality of scan line groups within one frame of the ultrasound image, and wherein the step b) further comprises the steps of:
  obtaining a power profile of the received noise corresponding to said one scan line per each scan line group based on the auto-correlation value; and
  determining a power level as greater than a predetermined value than the level of the power profile as said variable power threshold level corresponding to said one scan line per each scan line group.

21. The method of claim 16, wherein the step a) further comprises the step of receiving the noise corresponding to each of all scan lines within the ultrasound image during a the predetermined time interval corresponding to frames of the same number of said all scan lines, by sequentially acquiring a noise corresponding to one scan line within each of the frames during a time interval corresponding to said each frame of the ultrasound image, and wherein the step b) further comprises the steps of:
  obtaining a power profile of the received noise corresponding to said each of all scan lines based on the auto-correlation value; and
  determining a power level as greater than a predetermined value than the level of the power profile as said variable power threshold level corresponding to said each of all scan lines.

22. The method of claim 16, wherein the step a) further comprises the step of receiving the noise corresponding to one or more scan line within one frame of the ultrasound image by using a number of ensembles less than a predetermined number of ensembles, said predetermined number of ensembles are used to form the ultrasound image, and wherein the step b) further comprises the steps of:
  obtaining a power profile of the received noise corresponding to said one or more scan line based on the auto-correlation value; and
  determining said variable power threshold level corresponding to said one or more scan line by using the power profile.

* * * * *